United States Patent
Levitsky et al.

(10) Patent No.: US 11,438,129 B2
(45) Date of Patent: Sep. 6, 2022

(54) TECHNIQUES FOR FULL DUPLEX WIRELESS COMMUNICATIONS

(71) Applicant: QUALCOMM Incorporated, San Diego, CA (US)

(72) Inventors: Michael Levitsky, Rehovot (IL); Assaf Touboul, Netanya (IL); Arthur Gubeskys, San Diego, CA (US); Haim Mendel Weissman, Haifa (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/773,573

(22) Filed: Jan. 27, 2020

(65) Prior Publication Data

US 2021/0234664 A1 Jul. 29, 2021

(51) Int. Cl.
*H04L 5/14* (2006.01)
*H04B 17/318* (2015.01)
*H04W 72/14* (2009.01)
*H04W 72/04* (2009.01)

(52) U.S. Cl.
CPC ............. *H04L 5/14* (2013.01); *H04B 17/318* (2015.01); *H04W 72/04* (2013.01); *H04W 72/14* (2013.01)

(58) Field of Classification Search
CPC ......... H04L 5/14; H04L 5/001; H04L 5/0023; H04L 5/0044; H04L 5/0094; H04L 27/08; H04B 17/318; H04B 17/354; H04W 72/14; H04W 72/04; H04W 52/42; H04W 72/1263; H04W 72/1289
See application file for complete search history.

(56) References Cited

U.S. PATENT DOCUMENTS

| | | | |
|---|---|---|---|
| 2016/0330011 A1* | 11/2016 | Lee .................. | H04L 5/006 |
| 2017/0033916 A1* | 2/2017 | Stirling-Gallacher .... | H04L 5/14 |
| 2018/0097607 A1* | 4/2018 | Ji ..................... | H04W 72/046 |
| 2020/0236661 A1* | 7/2020 | Hassan Hussein . | H04W 72/042 |

* cited by examiner

*Primary Examiner* — Walli Z Butt
(74) *Attorney, Agent, or Firm* — Arent Fox, LLP

(57) ABSTRACT

Aspects described herein relate to configuring devices for performing full duplex communications, which may include inband full duplex communications for a given device or concurrent uplink and downlink communications for pairs or groups of devices.

21 Claims, 9 Drawing Sheets

TECHNIQUES FOR FULL DUPLEX WIRELESS COMMUNICATIONS

BACKGROUND

Aspects of the present disclosure relate generally to wireless communication systems, and more particularly, to full duplex communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In many wireless communication technologies, devices (e.g., user equipment) are configured to communicate with base stations (e.g., gNBs) over uplink and downlink resources in half duplex (e.g., such that the device either transmits communication or receives communications at a given point in time, but not both).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, from a base station, a downlink resource grant of downlink resources for receiving downlink communications from the base station, receiving, from the base station, an uplink resource grant of uplink resources for transmitting uplink communications in full inband duplex communications, wherein the uplink resources at least partially overlap the downlink resources in time and in frequency, and wherein the uplink resources correspond to a portion of punctured resource elements within the downlink resources, and transmitting, based on the uplink resource grant, the uplink communications over the portion of the punctured resource elements while receiving downlink communications in non-punctured resources corresponding to the downlink resource grant.

In another example, an apparatus for wireless communication is provided that includes a transceiver, a memory configured to store instructions, and one or more processors communicatively coupled with the memory and transceiver. The one or more processors are configured to receive, from a base station, a downlink resource grant of downlink resources for receiving downlink communications from the base station, receive, from the base station, an uplink resource grant of uplink resources for transmitting uplink communications in full inband duplex communications, wherein the uplink resources at least partially overlap the downlink resources in time and in frequency, and wherein the uplink resources correspond to a portion of punctured resource elements within the downlink resources, and transmit, based on the uplink resource grant, the uplink communications over the portion of punctured resource elements while receiving downlink communications in non-punctured resources corresponding to the downlink resource grant.

In another example, a method for wireless communications is provided. The method includes transmitting, to a device, a downlink resource grant of downlink resources for receiving downlink communications, transmitting, to the device, an uplink resource grant of uplink resources for transmitting uplink communications, wherein the uplink resources at least partially overlap the downlink resources in time and in frequency, determining, based at least in part on the uplink resource grant, to puncture a portion of resource elements of the downlink resources to allow for receiving uplink communications in full inband duplex communications, wherein the portion of resource elements include resource elements for the uplink transmission and additional resource elements, and transmitting, to the device, downlink communications over resource elements of the downlink resource grant that do not include the portion of resource elements determined to be punctured.

In another example, a method for wireless communication is provided that includes determining, based on one or more pairing criteria, a pair of devices for enabling concurrent uplink and downlink communications by the pair of devices, and scheduling the pair of devices for concurrent uplink and downlink communications on the same resources.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
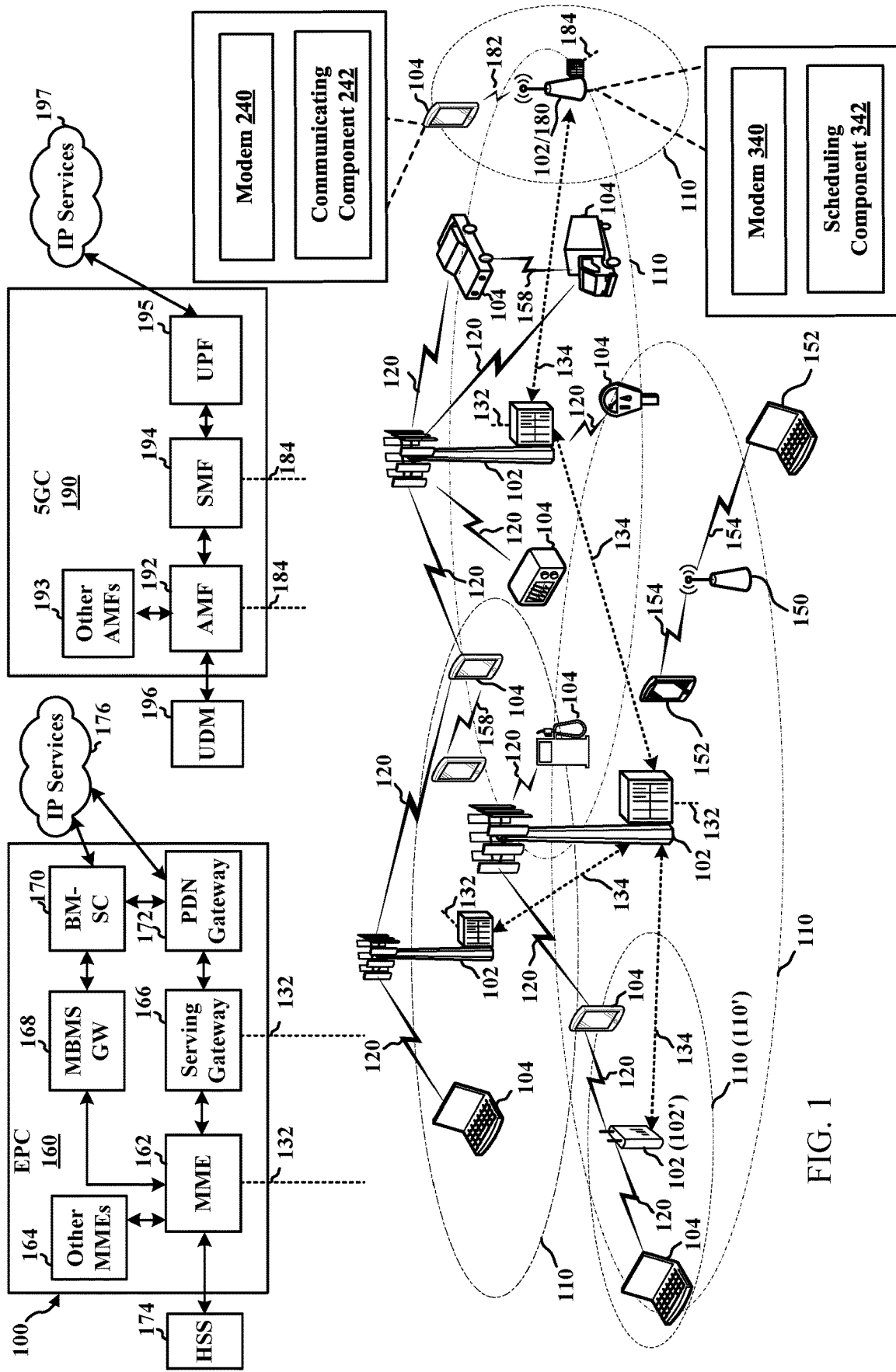
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mechanisms for providing full duplex functionality in wireless communications. In addition, aspects described herein relate to providing full duplex functionality within a frequency band allocated to communicating devices as specified by a wireless communication technology (referred to herein as "inband") such that additional frequency resources or channels may not be required for concurrent full duplex communications. In one example, certain resource elements of a downlink allocation can be punctured for inband uplink transmission. In another example, devices can be paired for configuring for full duplex communications (which may or may not include inband full duplex) so as not to interfere with one another, where the pairing can be based on the devices being within a threshold distance of one another, associated with spatially orthogonal beams, etc., as described further herein. The described mechanisms for full duplex communication may provide significant benefits in certain wireless communication technologies, such as fifth generation (5G) new radio (NR).

For example, some issues with the current 5G NR millimeter wave (mmW) systems/deployments may include limited mobility, which can mostly result from one or more of insufficient coverage due to small mmW cell size, limited device (e.g., user equipment (UE)) performance at high speeds (e.g., as a result of insufficient pilot density, delay in overall channel state feedback (CSF) reporting turn around, etc.), delay in beam forming mechanisms (e.g., beam management (BM)) or corresponding complexity in framework per specification definition to allow truly supported high mobility, delay in handover (HO) procedures, which may result from very small cell size, etc. Once UE performance limitations for high speed scenarios are mitigated, fast CSF, BM and HO procedures may become possible bottle neck issues. Components of the framework can be addressed in order to allow faster BM, CSF and HO mechanisms, such as an ability to provide a continuous uplink (UL) per UE to enable continuous control data exchange with the network (NW) to assist the addressed above procedures. This can be enabled at least in part by providing full duplex operation on inband frequencies, as described further herein.

Some UL transmissions, such as control data transmissions or other transmissions that may be deemed as critical, can have low volume that may not require more than several resource blocks (RBs) for transmission. Enabling full duplex communications may allow to gain from channelization in terms of UL power/coverage and may support such communications in a reliable manner at cell edge. In general, in full duplex communications, same frequency operation may be problematic on a UE side because of coupling from transmitter (Tx) to receiver (Rx). In case of mmW, for example, full duplex may be more feasible than in case of a Sub-6 gigahertz (gHz) system (e.g., where signal power may be directional and decaying very fast in space/distance), such that at least low noise amplifier (LNA) saturation because of simultaneous UL is not expected for non-cell edge scenarios (e.g., when using maximum UL power). In mmW, however, the possibility to get to a threshold isolation between Tx and Rx (e.g., around 110 decibel (db) in order not to introduce Rx de-sensing) may be questionable, and/or may require some analog and digital cancellation on Rx side, which can be complex. Aspects described herein relate to addressing at least in part by scheduling UEs for inband full duplex. For example, UL resources for mmW UEs can be scheduled on the same frequency range where DL is operated without involving significant extra complexity on UE side. In one example, the UL resources may be small volume for control or other communications deemed critical, and/or may be continuous if instant availability is desired.

Providing the UL resources within the DL frequency range can allow for various benefits. For example, in mmW systems, this can allow for fast and continuous beam management reporting that allows faster turn-around for P1, P2 BM steps (e.g., which can allow for providing high mobility for mmW), fast and continuous CSF reporting that allows tighter LA for mobile scenarios (e.g., which can allow for supporting fast beam tracking procedures since every beam change requires CSF update), fast beam failure recovery (BFR) process, which can start immediately at any time and does not wait for the next UL subframe (SF) (e.g., which can decrease the radio link failure (RLF) probability for high mobility scenarios in mmW), fast HO procedures where the UE transmission related steps can be done faster (e.g., this can allow high mobility for mmW), acknowledgement (ACK)/negative-NACK (NACK) or other hybrid automatic repeat/request (HARQ) feedback latency reduction (e.g., which can allow to support ultra low latency applications and/or allows to decrease the number of HARQ processes and safe memory and cost on UE side), speeding up connected mode discontinuous reception (CDRX) wake up by providing immediate LA and BM report (e.g., having more smooth wake up may allow more frequent CDRX sessions and may save more UE battery), etc.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating using inband full duplex, and some nodes may have a modem 340 and scheduling component 342 for scheduling devices for inband full duplex communications, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can communicate with a base station 102 using inband full duplex, which may be based on scheduling information received from the base station 102. In one example, scheduling component 342 may schedule a UE 104 with uplink resources for transmitting uplink communications where the uplink resources include resources elements that are allocated within downlink resources of a downlink resource grant. Scheduling component 342 can select resource elements for uplink communications such that the UE 104 can transmit the uplink communications while receiving downlink communications with less than a threshold level of expected interference. In addition, in an example, scheduling component 342 can pair UEs for scheduling downlink and/or uplink communications such that at least one UE scheduled for uplink communications is not likely to interfere with the other UE scheduled for downlink communications when communicating over the same or similar (e.g., overlapping or adjacent) frequency resources for providing complementary full duplex over a cell.

Figure 2:
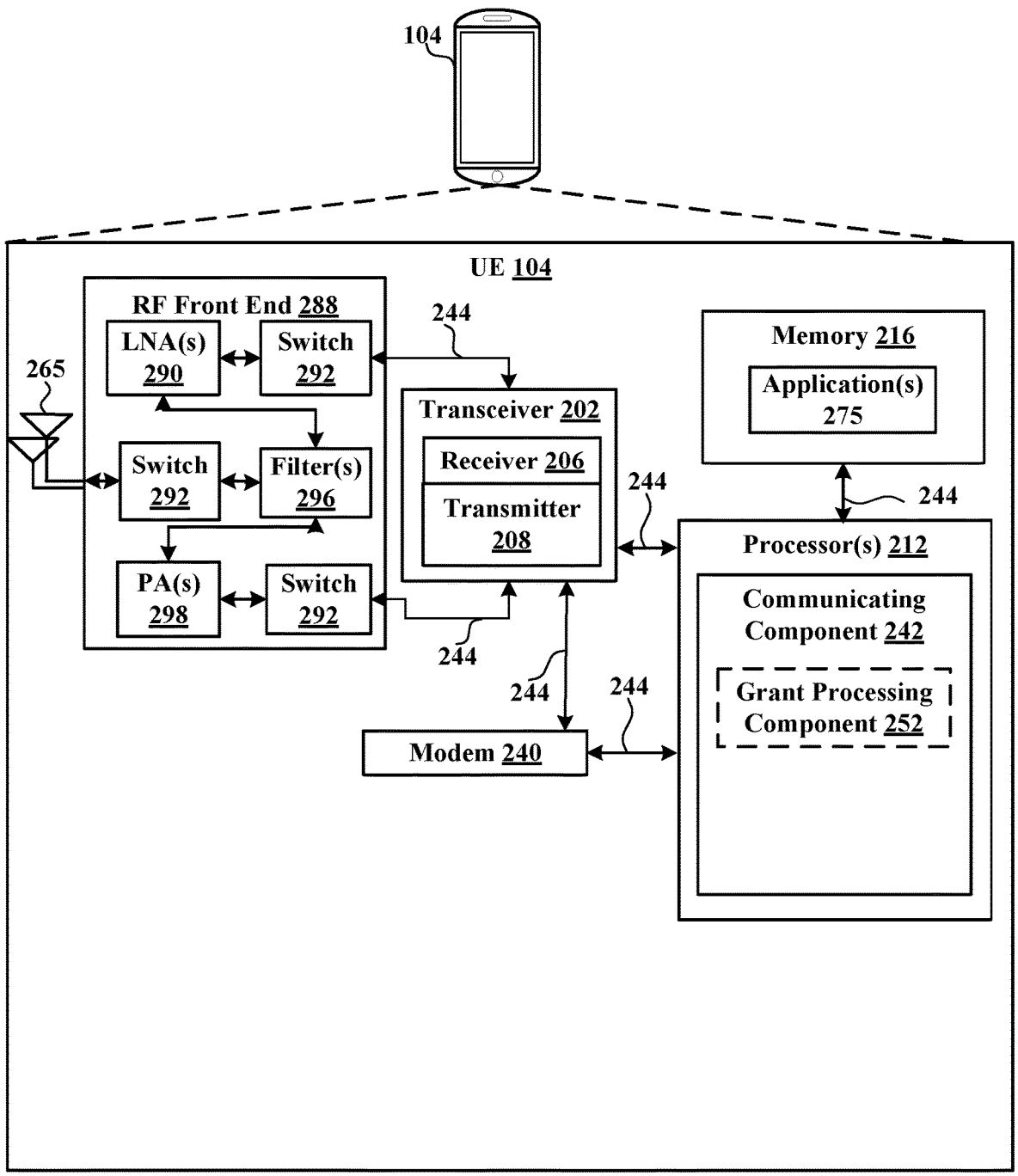
FIG. 2 is a block diagram illustrating an example of a UE, in accordance with various aspects of the present disclosure.
Figure 3:
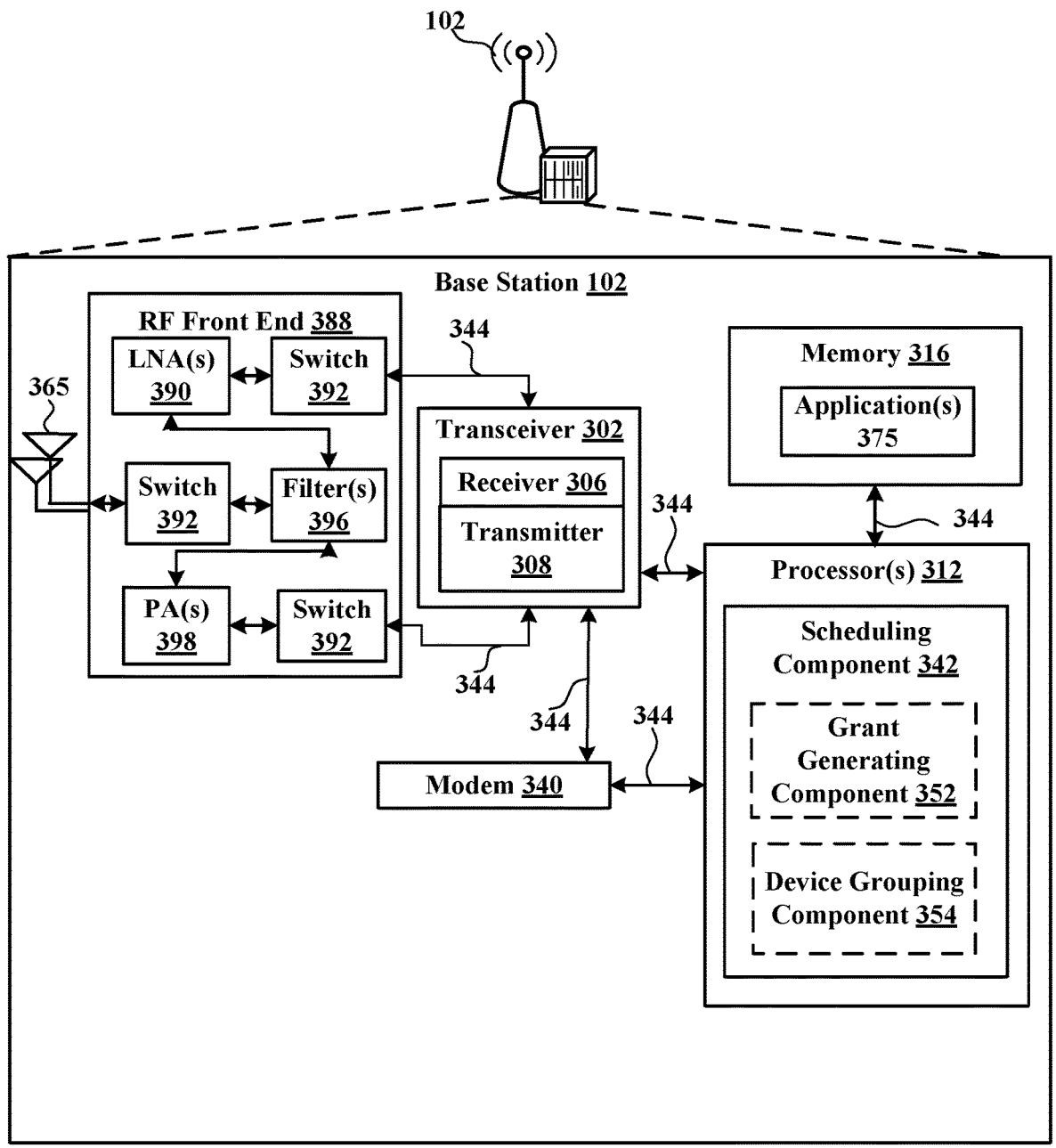
FIG. 3 is a block diagram illustrating an example of a base station, in accordance with various aspects of the present disclosure.
Figure 4:
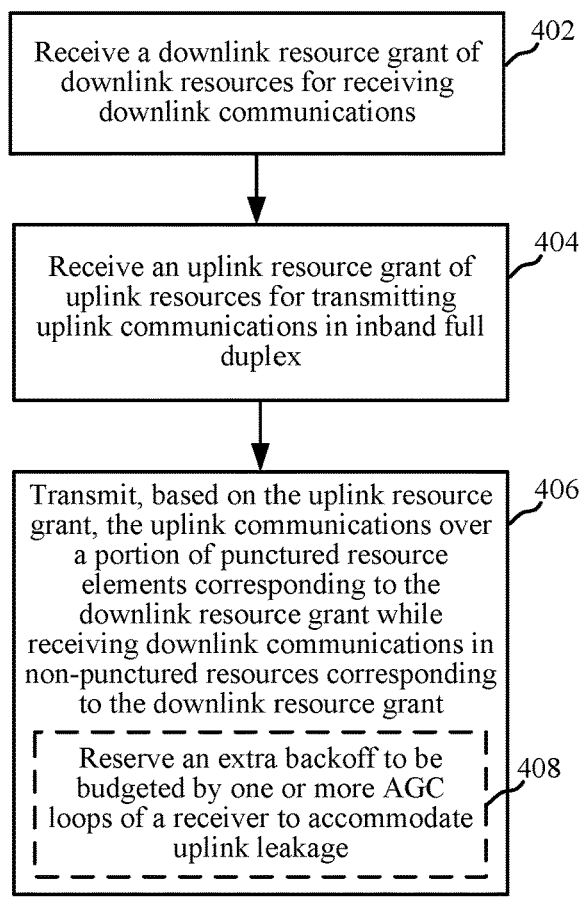
FIG. 4 is a flow chart illustrating an example of a method for performing inband full duplex communications, in accordance with various aspects of the present disclosure.
Figure 5:
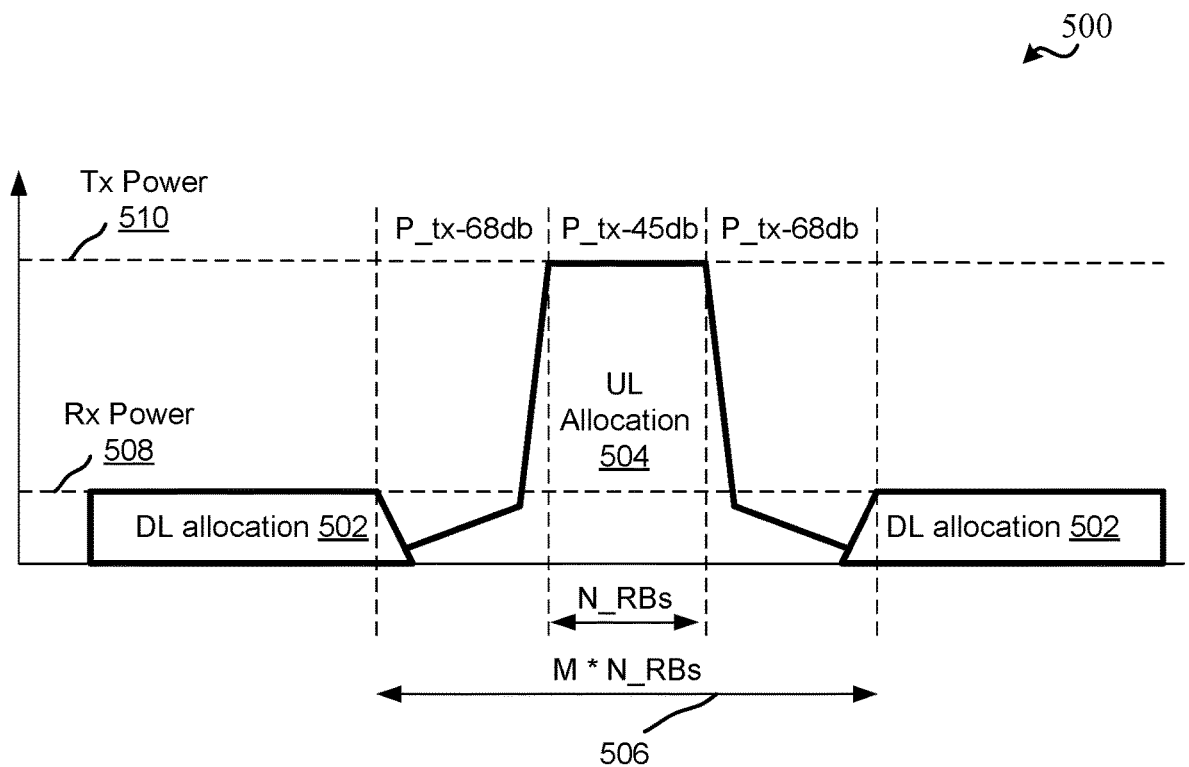
FIG. 5 illustrates an example of a system for allocating frequency resources for inband full duplex communications, in accordance with various aspects of the present disclosure.
Figure 6:
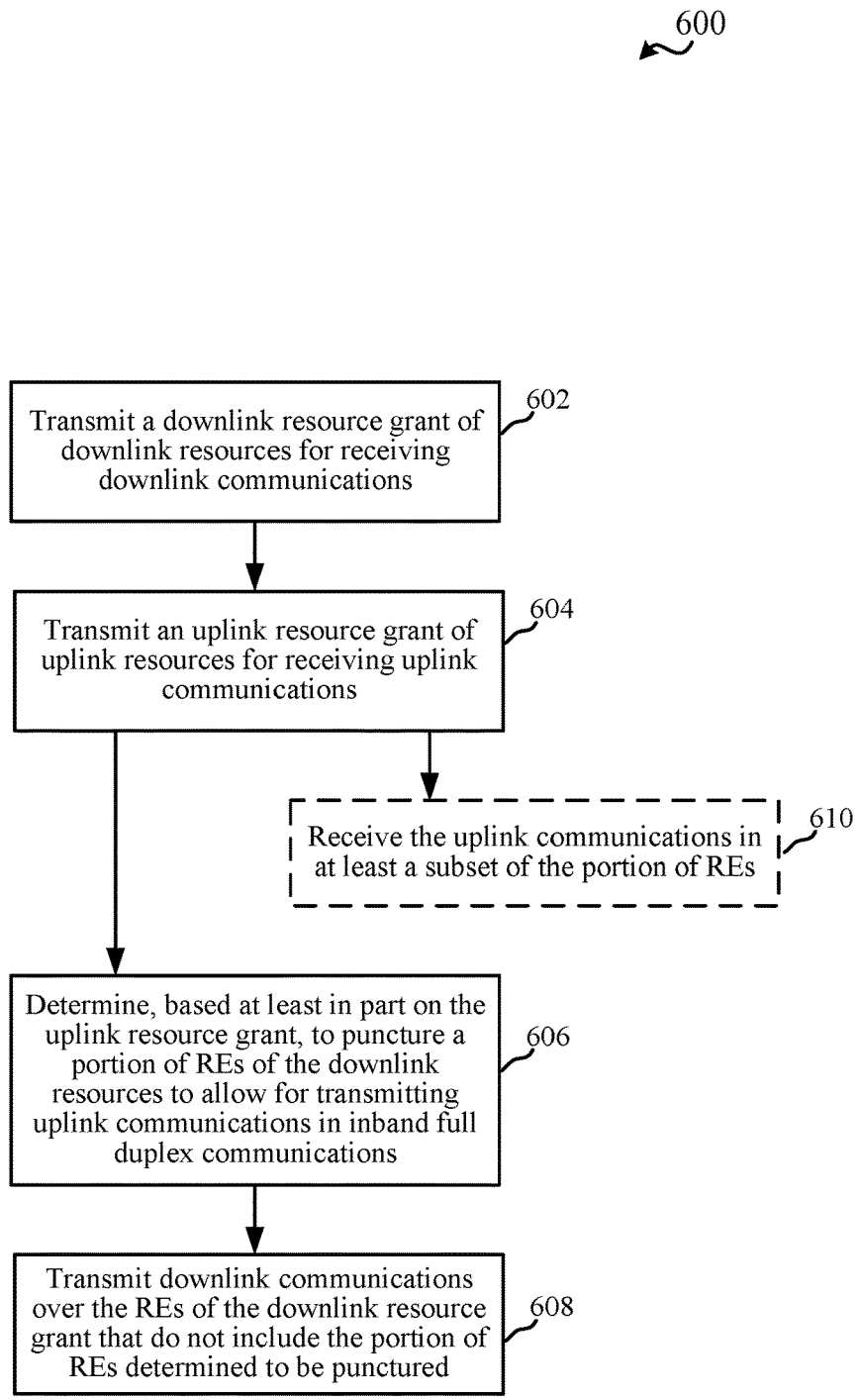
FIG. 6 illustrates an example of a method for configuring devices for inband full duplex communications, in accordance with various aspects of the present disclosure.
Figure 7:
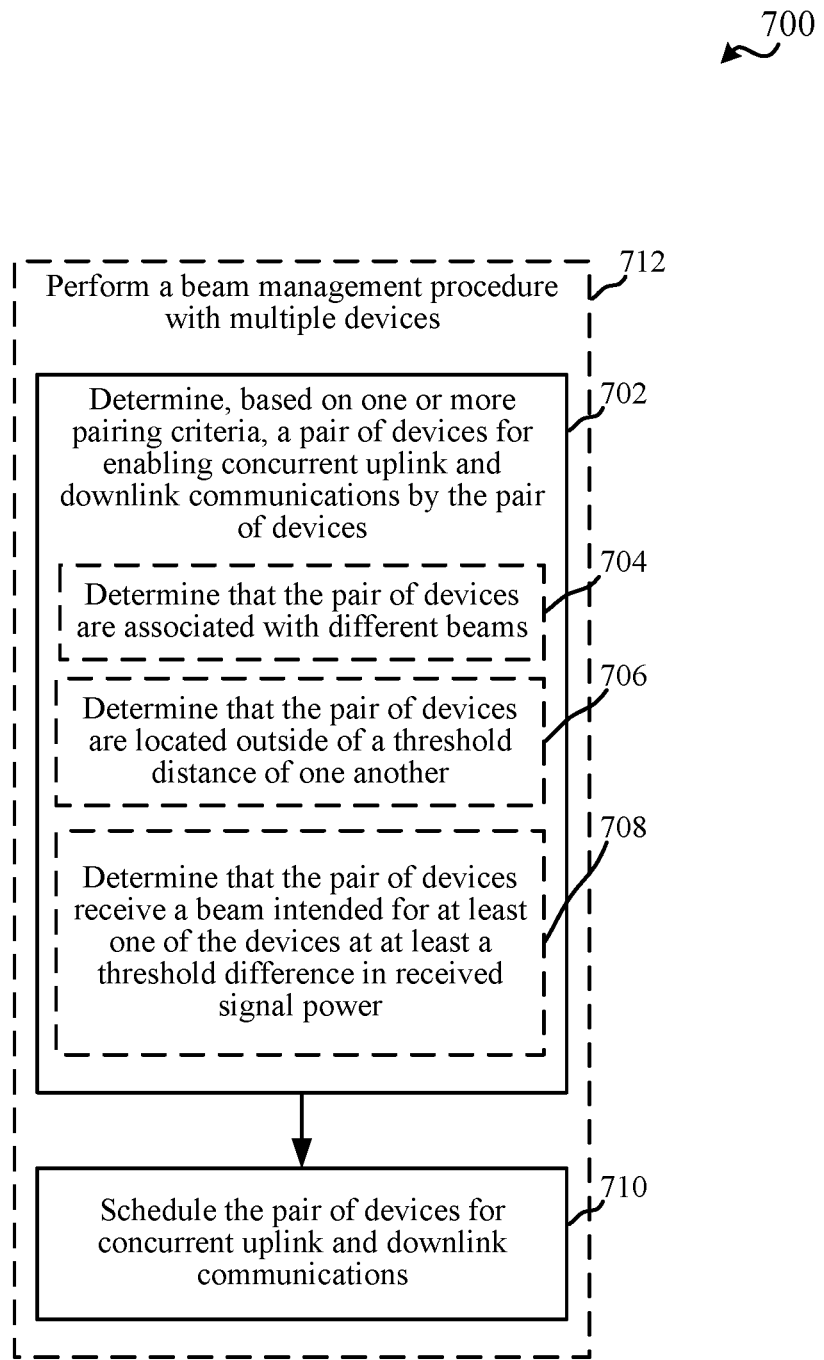
FIG. 7 illustrates an example of a method for configuring pairs or groups of devices for performing concurrent uplink and downlink communications, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4, 6, and 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for participating in inband full duplex communications, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a grant processing component 252 for processing a downlink resource grant that may be received from a base station and may indicate a set of downlink resources over which the UE 104 is to receive downlink communications from the base station, processing an uplink resource grant that may be received from a base station and may indicate a set of uplink resources over which the UE 104 is to transmit uplink communications to the base station, etc., as described further herein.

In an aspect, the processor(s) 212 may correspond to one or more of the processors described in connection with the UE in FIG. 10. Similarly, the memory 216 may correspond to the memory described in connection with the UE in FIG. 10.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling UEs for inband full duplex communications, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a grant generating component 352 for generating a downlink resource grant indicating a set of downlink resources over which the UE is to receive downlink communications from the base station 102, generating an uplink resource grant indicating a set of uplink resources over which the UE is to transmit uplink communications to the base station 102, etc. Moreover, scheduling component 342 can optionally include a device grouping component 354 for pairing two devices, or otherwise grouping more than two devices, for communicating with the base station 102, where one UE in the pair can transmit uplink communications while the other UE in the pair receives downlink communications without (substantially) interfering with one another, as described further herein.

In an aspect, the processor(s) 312 may correspond to one or more of the processors described in connection with the base station in FIG. 10. Similarly, the memory 316 may correspond to the memory described in connection with the base station in FIG. 10.

FIG. 4 illustrates a flow chart of an example of a method 400 for communicating using inband full duplex. In an example, a UE 104 can perform the functions described in method 400 using one or more of the components described in FIGS. 1-2.

In method 400, at Block 402, a downlink resource grant of downlink resources for receiving downlink communications can be received. In an aspect, grant processing component 252, e.g., in conjunction with processor(s) 212, memory 216, transceiver 202, communicating component 242, etc., can receive (e.g., from a base station 102) the downlink resource grant of downlink resources for receiving downlink communications. For example, the downlink resource grant can be associated with frequency resources corresponding to a channel in a wireless communication technology (e.g., 5G NR). In one example, the downlink resource grant may indicate a portion of resource elements (REs) or resource blocks (RBs) that are granted for receiving the downlink communications and/or can indicate a portion of time (e.g., one or more symbols, slots, subframes, etc.) over which downlink communications can be received. For example, as described herein, a symbol may refer to an orthogonal frequency division multiplexing (OFDM) symbol, single-carrier frequency division multiplexing (SC-FDM) or similar symbol, a slot may include a collection of symbols, and/or a subframe may include multiple slots (e.g., as defined in LTE or 5G NR). In addition, for example, grant processing component 252 can receive the downlink resource grant over a physical downlink control channel (PDCCH), based on a downlink control information (DCI) format, etc.

In method 400, at Block 404, an uplink resource grant of uplink resources can be received where the uplink resource grant is for transmitting uplink communications in inband full duplex. In an aspect, grant processing component 252, e.g., in conjunction with processor(s) 212, memory 216, transceiver 202, communicating component 242, etc., can receive (e.g., from the base station 102) the uplink resource grant of uplink resources for transmitting the uplink communications in inband full duplex. Similarly, for example, the uplink resource grant can be associated with frequency resources corresponding to the same channel as the downlink resource grant in the wireless communication technology (e.g., 5G NR). In one example, the uplink resource grant may indicate a portion of REs or RBs within the channel that are granted for transmitting the uplink communications. In another example, communicating component 242 can determine the portion of REs or RBs within the channel that are to be used for transmitting uplink communications (e.g., a number of REs or RBs centered in the channel). In another example, the uplink resource grant can indicate a portion of time (e.g., one or more symbols, slots, subframes, etc.) over which uplink communications can be transmitted. In an example, the portion of time can at least partially overlap the portion of time corresponding to the downlink resource grant, such that the UE 104 can be scheduled to concurrently receive downlink communications and transmit uplink communications. Similarly, for example, the frequency resources corresponding to the uplink resource grant and the downlink resource grant can also at least partially overlap (e.g., be part of the same channel). In addition, for example, grant processing component 252 can receive the uplink resource grant over a PDCCH, based on a DCI format, etc.

In method 400, at Block 406, the uplink communications can be transmitted, based on the uplink resource grant, over a portion of punctured REs corresponding to the downlink resource grant while receiving downlink communications in non-punctured resources corresponding to the downlink resource grant. In an aspect, communicating component 242, e.g., in conjunction with processor(s) 212, memory 216, transceiver 202, etc., can transmit, based on the uplink resource grant, the uplink communications over the portion of punctured REs corresponding to the downlink resource grant while receiving downlink communications in non-punctured resources corresponding to the downlink resource grant. As described, for example, communicating component 242 can use inband full duplex communicating in this regard. For example, the downlink resources can have REs that are punctured by the communicating component 242 for uplink communications. For example, the punctured REs can be within the downlink resources, and can include the portion of REs for transmitting uplink communications and/or one or more other portions to account for leakage from uplink transmissions. In one example, the decision regarding the punctured REs in the downlink resource grant can be taken based on existence of the uplink resource grant on the same REs to the same UE, and communicating component 242 can accordingly determine to puncture the REs for transmitting uplink communications based on the decision.

Similarly, in one example, the puncturing may not be indicated in the downlink resource grant, but may be assumed based on receiving an uplink resource grant for transmitting uplink communications, in inband full duplex, within time and/or frequency resources of the downlink resource grant, as described further herein. In another example, the downlink resource grant may indicate the puncturing or may otherwise indicate the non-punctured REs over which the downlink communications are transmitted. As described, for example, the uplink resource grant can be in REs that are a fraction of punctured REs (e.g., a middle N_RBs in a larger collection of punctured REs, such as a multiple, M, multiplied by the number of RBs–M*N_RBs, as shown in FIG. 5). For example, the uplink resource grant can be in REs that are substantially in a center of punctured REs to allow for leakage of the uplink transmission on either side of the allocated REs of the uplink resource grant when transmitting a signal over the allocated REs.

FIG. 5 illustrates an example of a resource allocation 500 for inband full duplex communications. Resource allocation 500 is represented by frequency on the horizontal axis and power on the vertical axis. Resource allocation 500 includes a downlink allocation 502, which can include downlink resources received in a downlink resource grant. Resource allocation 500 can include REs punctured for an uplink allocation 504, which can include uplink resources received in an uplink resource grant. For example, the punctured REs can include a number of REs (or RBs, where each RB can be a collection of REs). For example, a RE can be a measure of frequency over time, and an RB can include multiple REs in frequency (e.g., 12 subcarriers in LTE and NR) over one or more periods of time (e.g., multiple symbols). In resource allocation 500, an uplink allocation 504 can be represented as a number, N, of RBs (shown as "N_RBs"). In this example, in resource allocation 500, a base station 102 can determine to puncture the RBs of the UL allocation 504 (N_RBs) as well as N_RBs on either side of the UL allocation 504, to yield M*N_RBs 506 of punctured resources (e.g., M=3), in transmitting downlink communications. Accordingly, the base station 102 can determine the DL allocations 502 as the remaining RBs (or REs), as shown, and can transmit downlink communications over the resources remaining for DL allocation 502. The UE 104 can receive the downlink communications in resources corresponding to DL allocations 502 and can concurrently transmit uplink communications in resources corresponding to UL allocation 504 in inband full duplex communications. In addition, resource allocation 500 shows example Rx power 508 and Tx power 510 on the vertical axis, where Rx power 508 can represent an expected leakage of uplink signals transmitted with Tx power 510 at the downlink receiver using uplink and downlink separation or leakage assumption along with transmit mask requirements.

In one example, given the fact that mmW can have a emission mask requirements (e.g., −23 dbc on adjacent channel) the same number of REs that are used for UL transmission on the right and on the left side of it can also introduce a non-negligible leakage on Rx reception. The base station 102 can accordingly puncture these REs from DL allocation, as described above. As described, in an example, assuming that UL allocation size is N_RBs, the base station 102 can puncture/exclude M*N_RBs range around and including the UL allocation REs.

In another example, the resource elements of the uplink resource grant can be provided within the downlink resource grant in this regard for certain types of communications (e.g., only control data transmissions over a physical uplink control channel (PUCCH) or physical uplink shared channel (PUSCH), only certain types of control data transmissions, such as HARQ feedback, etc.), or for substantially any or all uplink communications. In an example, moving to inband FD concept for mmW in this regard may remove a requirement for dedicated DL/UL symbol, subframe, or slot types (at least for some symbols, subframes, or slots). In another example, each UE can get UL allocation on the same symbol, subframe, slot, etc. where it gets DL allocation. UL transmission may be limited to a small number of RBs (small volume control critical information, which may be N_RBs, as shown). Both PUCCH and PUSCH can be addressed, in one example. Moreover, for example, UE 104 can have multiple Rx/Tx antenna modules, which can allow for using different modules/elements for simultaneous Tx and Rx to provide further separation and possibly mitigate self-interference. For example, using the different modules/elements can allow overall Tx to Rx separation in range of 40-55 db when concurrently operating in inband full duplex, which may prevent Rx saturation due to Tx coupling at least for non-cell edge scenarios. In an example, cell edge scenarios can be addressed by pairing UEs, as described below, in one example.

Moreover, in an example, the UE 104 can determine and use two UE beams—one for transmitting and one for receiving. Thus, in an example, communicating component 242 can transmit uplink communications over the portion of REs based on a first beam and may receive downlink communications over the resources of the downlink resource grant based on a second beam. For example, using beams can correspond to selectively applying power to antenna resources (e.g., according to a beamforming matrix) to achieve a directionality for transmitting or receiving signals. In one example, using a beam can correspond to using different antenna modules distributed over the UE 104 (e.g., physically distributed within a housing of the UE 104), where each antenna module may or may not form a beam pointing to the same or similar direction. In this example, two technically different beams may have better separation because of maximum available spacing between the antenna modules within the UE 104, but both beams may use approximately the same beam direction and width in one example.

In addition, for example, the puncturing may not be explicit in the resource grants, but once UE 104 receives scheduling (e.g., the downlink resource grant and the uplink resource grant) for simultaneous UL and DL allocation, communicating component 242 can determine to puncture resource elements in the downlink resource grant for transmitting uplink communications, as shown and described above. In addition, the base station 102 can also assume the puncturing, as described further herein, based on granting the simultaneous (or at least overlapping) UL and DL allocation. In this example, it may be assumed that there is no extra control information exchange between the UE 104 and base station 102. In one example, simultaneous UL transmission can be done only on symbols having PDSCH allocation in DL (not on any kind of DL pilot or control, e.g., PDCCH, communication).

In one example, as part of transmitting the uplink communications at Block 406, optionally at Block 408, an extra backoff to be budgeted by one or more automatic gain control (AGC) loops at a receiver to be reserved to accommodate uplink leakage. In an aspect, communicating component 242, e.g., in conjunction with processor(s) 212, memory 216, transceiver 202, etc., can reserve the extra backoff for the one or more AGC loops at the receiver (e.g., a receiver portion of transceiver 202) to accommodate or otherwise account for uplink leakage in transmitting using inband full duplex. For example, a Rx AGC loop, which may be part of RF front end 288 (e.g., part of a PA 298) can make an a-priori backoff (BO) reservation on the symbols where simultaneous UL transmission and DL reception is performed. For example, given known Tx power, Rx RSSI (e.g., without Tx) and isolation numbers, communicating component 242 can calculate or at least estimate an AGC change in advance for reserving the BO.

FIG. 6 illustrates a flow chart of an example of a method 600 for configuring devices for communicating using inband full duplex. In an example, a base station 102 (e.g., in conjunction with other network components of radio access network (RAN), backend core network, etc., or otherwise) can perform the functions described in method 600 using one or more of the components described in FIGS. 1-3.

In method 600, at Block 602, a downlink resource grant of downlink resources for receiving downlink communications can be transmitted. In an aspect, grant generating component 352, e.g., in conjunction with processor(s) 312, memory 316, transceiver 302, scheduling component 342, etc., can transmit (e.g., to a UE 104) the downlink resource grant of downlink resources for receiving downlink communications. As described, the downlink resource grant can correspond to resources of a channel defined in a wireless communication technology and/or can indicate a period of time over which the downlink resources are granted (e.g., to the UE 104) for receiving the downlink communications.

In method 600, at Block 604, an uplink resource grant of uplink resources for receiving uplink communications can be transmitted. In an aspect, grant generating component 352, e.g., in conjunction with processor(s) 312, memory 316, transceiver 302, scheduling component 342, etc., can transmit (e.g., to the UE 104) the uplink resource grant of uplink resources for receiving uplink communications (e.g., from the UE 104). As described, the uplink resource grant can correspond to resources of the same channel as the downlink resource grant and/or can indicate a period of time over which the uplink resources are granted (e.g., to the UE 104) for receiving the uplink communications. As described for example, the period of time may at least partially overlap the period of time associated with the downlink resource grant, which may indicate use of inband full duplex communications. Similarly, for example, the frequency resources corresponding to the uplink resource grant and the downlink resource grant can also at least partially overlap (e.g., be part of the same channel, use a same or similar set of subcarriers, etc.).

In method 600, at Block 606, it can be determined, based at least in part on the uplink resource grant, to puncture a portion of REs of the downlink resources to allow for transmitting uplink communications in inband full duplex communications. In an aspect, scheduling component 342, e.g., in conjunction with processor(s) 312, memory 316, transceiver 302, etc., can determine, based at least in part on the uplink resource grant, to puncture the portion of REs of the downlink resources to allow for transmitting the uplink communications in inband full duplex communications. For example, scheduling component 342 can determine to puncture the portion of REs and not transmit downlink communications over the REs (at least in a given time period) based on the uplink resource grant granting REs for transmitting uplink communications. In one example, the decision regarding the punctured REs in the downlink resource grant can be taken based on existence of the uplink resource grant on the same REs to the same UE, and scheduling component 342 can accordingly determine to puncture the REs for transmitting uplink communications based on the decision. As described, for example, scheduling component 342 can determine to puncture the REs associated with the uplink resource grant as well as additional REs around the uplink resources. For example, for a uplink allocation size of N_RBs, scheduling component 342 can determine to puncture M*N_RBs, including the N_RBs of the uplink resource allocation and N_RBs on either side (in frequency).

In method 600, at Block 608, downlink communications can be transmitted over the REs of the downlink resource grant that do not include the portion of the REs determined to be punctured. In an aspect, scheduling component 342, e.g., in conjunction with processor(s) 312, memory 316, transceiver 302, etc., can transmit downlink communications over the REs of the downlink resource grant that do not include the portion of the REs determined to be punctured. For example, scheduling component 342 can determine to transmit the downlink communications over the REs that are not punctured such to allow the UE 104 to transmit over a portion of the punctured REs and accounting for leakage in additional portions of the punctured REs. For example, referring to FIG. 5, scheduling component 342 can transmit the downlink communications in DL allocation 502 while puncturing the M*N_RBs for uplink communications.

In method 600, optionally at Block 610, uplink communications can be received in at least a subset of the portion of REs. In an aspect, scheduling component 342, e.g., in conjunction with processor(s) 312, memory 316, transceiver 302, etc., can receive the uplink communications in at least the subset of the portion of REs. For example, the subset can be among the punctured REs, and can be in a substantially middle position (in frequency) to allow for leakage in surrounding REs, or can otherwise be surrounded by other punctured REs. Though shown in a different Block of the method 600, the uplink communications can be received at the same time, or at least overlapping in time, as transmitting the downlink communications (e.g., at Block 608) in full duplex communications.

Moreover, in an example, scheduling component 342 can transmit the downlink communications according to a first beam while receiving the uplink communications according to a second beam, as described, where the second beam may have a different width or direction than the first beam. The two beams can have sufficient separation in order to allow UL reception of the uplink communications based on the second beam at the receiver (e.g., a receiver portion of transceiver 302) with leaking into the UL receiver of DL transmission from transmitting the first beam. If the separation between the beams is not enough, the received signal (e.g., the uplink communications) can be saturated with the DL transmission, which can affect decoding of the received signal. Separation for the beams may be achieved by scheduling component 342 using different antenna panels/modules that are far away enough one from another to transmit and receive signals in order to allow the separation. In one example, the different antenna panels/modules that can transmit beams with sufficient spatial separation can be defined for the base station 102 or can be determined based on a calibration procedure of transmitting available transmit beams and measuring received energy on available receive beams, FIG. 7 illustrates a flow chart of an example of a method 700 for pairing or grouping devices for configuring for inband full duplex communications. In an example, a base station 102 (e.g., in conjunction with other network components of radio access network (RAN), backend core network, etc., or otherwise) can perform the functions described in method 700 using one or more of the components described in FIGS. 1-3.

In method 700, at Block 702, a pair of devices can be determined, based on one or more pairing criteria, for enabling concurrent inband full duplex communications by the pair of devices. In an aspect, device grouping component 354, e.g., in conjunction with processor(s) 312, memory 316, transceiver 302, scheduling component 342, etc., can determine, based on the one or more pairing (or grouping) criteria, the pair (or group) of devices for enabling concurrent inband full duplex communications by the pair (or group) of devices. For example, the criteria can attempt to ensure the pair (or group) of devices can concurrently communicate with the base station 102 using inband full duplex communications without interfering with one another. In addition, device grouping component 354 can determine pairs or groups of devices (e.g., UEs) based on detecting one or more triggers or events (e.g., based on movement of a UE, a change in beam used by the UE, change in signal quality or power of the UE, detecting handover of UE to the base station 102, etc.). In addition, the criteria for grouping or pairing UEs can relate to beams used per UE (e.g., by the scheduling component 342 in transmitting downlink communications to and/or receiving communications from the UE), distance or separation between the UEs, received signal power from the UEs, etc.

In an example, in determining the pair of devices at Block 702, optionally at Block 704, it can be determined that the pair of devices are associated with different beams. In an aspect, device grouping component 354, e.g., in conjunction with processor(s) 312, memory 316, transceiver 302, scheduling component 342, etc., can determine that the pair of devices are associated with different beams. For example, device grouping component 354 may determine that the devices are associated with beams that are spatially orthogonal or have at least a threshold degree of spatial orthogonality, which may be an indication that the devices are located within an adequate distance to not interfere with one another. Thus, in one example, device grouping component 354 can test the beams, which can be the serving beams used for communicating between the base station 102 and each of the UEs, for spatial separation to determine whether the UEs can be paired. For example, this can include determining whether leakage associated with the beams is less than a threshold.

In one example, determining a pairing of devices may be based on determining that the devices are associated with beams having sufficient spatial separation. In an example, this determination can be based on one or more of: 1) the leakage received from the receiver of the base station 102 when transmitting the beams by the transmitter of the base station 102; or (2) leakage from a UE transmitting an uplink communication to a UE receiving a downlink communication. In an example, device grouping component 354 can determine or measure the leakage received from the receiver of the base station 102 when transmitting the beams by the transmitter of the base station 102 (e.g., based on a calibration procedure as described above). Device grouping component 354, however, may not be able to measure leakage from a UE transmitting an uplink communication to a UE receiving a downlink communication. This potential leakage can be inferred from other measurements, such as RSRP of signals from the base station 102 as measured and reported by the UEs. If the leakage associated with the beams, using either or both of the above criteria or other criteria, is less than the threshold, UEs using the beams can be paired, which may be subject to additionally determining that the UEs are substantially spatially separated in distance and/or RSRP, as described further herein.

In an example, in determining the pair of devices at Block 702, optionally at Block 706, it can be determined that the pair of devices are located outside of a threshold distance of one another. In an aspect, device grouping component 354, e.g., in conjunction with processor(s) 312, memory 316, transceiver 302, scheduling component 342, etc., can determine that the pair of devices are located outside of the threshold distance of one another. In one example, device grouping component 354 may determine the distance between the devices based on determining that the devices are associated with the same beams or beams that do not have at least the threshold degree of spatial orthogonality. Such devices may still be paired, in an example, where they are located outside of the threshold distance of one another.

In an example, in determining the pair of devices at Block 702, optionally at Block 708, it can be determined that the pair of devices receive a beam, intended for at least one of the devices, at at least a threshold difference in received signal power. In an aspect, device grouping component 354, e.g., in conjunction with processor(s) 312, memory 316, transceiver 302, scheduling component 342, etc., can determine that the pair of devices receive a beam, intended for at least one of the devices, at at least a threshold difference in received signal power. In one example, device grouping component 354 may determine the signal power difference between the devices based on determining that the devices are associated with the same serving beams or serving beams that do not have at least the threshold degree of spatial orthogonality. Such devices may still be paired, in an example, where a beam transmitted by the base station 102 intended for first one of the pair of devices is received at the pair of devices at at least a threshold difference in signal power. This difference in signal power may imply a separation between the devices such that, where the difference in signal power is high enough, uplink signals transmitted by one device in the pair do not substantially interfere with signals transmitted to the other device in the pair over overlapping time and frequency resources. In one example, the reported signal powers from the devices for a beam intended for at least one of the devices in the pair can be an indication of leakage of a beam intended for one device to a receiver of the other device, which can imply separation between the devices. Thus, in one example, determining the distance in connection with Block 706 may be based at least in part on the signal power(s) determined at Block 708.

In method 700, at Block 710, the pair of devices can be scheduled for concurrent uplink and downlink communications. In an aspect, scheduling component 342, e.g., in conjunction with processor(s) 312, memory 316, transceiver 302, etc., can schedule the pair of devices for concurrent uplink and downlink communications. For example, scheduling component 342 can schedule at least a first device of the pair (or group) of devices to transmit uplink communications and receive at least a second device of the pair (or group) of devices to receive downlink communications over the same channel (e.g., the same REs, RBs, etc.) and in resources that at least partially overlap in time. In addition, in an example, this option can be applicable for cell edge UEs that may require highest UL power, and thus Tx to Rx leakage can cause to Rx saturation at the UE, and thus scheduling component 342 may determine to attempt to pair cell-edge UEs with other UEs for concurrent uplink and downlink communications.

In this regard, for example, scheduling component 342 can perform smart scheduling of the same resources for simultaneous UL and DL allocations for selected pairs (or groups) of UEs to enable inband full duplex mmW system (though not necessarily inband full duplex for a given UE). Moving to inband full duplex concept for mmW can rid of DL/UL SF types, as described above. In this example, NW can properly pair UEs to exclude mutual coupling between them in case of simultaneous UL from one of them and scheduled DL for another UE from a pair. The outcome can include be a list of UE pairs suitable to simultaneous UL/DL operation based on the pairing criteria described above. The pairing can be possible in case of mmW due, at least in part, to directional transmissions and fast power decay in space.

As described, for example, device grouping component 354 can determine pairs of UEs as UEs that use spatially orthogonal NW Tx beams, which can be known on NW side as a part of beam tracking per UE, as described above. In this case, these UEs may not sense each other and there will likely be no UL coupling from one of them to DL of the another one. For example, the NW may know the spatially orthogonal beams based at least in part on whether the beams use antenna resources that are spaced apart (e.g., at at least a threshold distance) at the NW (e.g., the base station). Similarly, the NW can transmit and receive simultaneously on the same resources with the UEs without significant interference.

As described, in another example, device grouping component 354 can determine pairs of UEs that use the same or spatially close NW Tx beams as being distant enough one from another (e.g., to allow ~110 db spatial isolation between them). For example, device grouping component 354 can determine this from the measured/reported RSRP values by a first UE on DL serving beam of another UE and/or vice versa (e.g., RSRP values on the relevant Tx beams can be known to a NW from the provided by UEs BM reports or from the UL based measurements). In an example, NW can schedule BM P2 resources to tested UE pairs in a proper way to assist this pairing procedure, which may assist in guaranteeing DL reception at a first UE simultaneous with UL transmission by a second UE on the same resource. Isolation can also be used on the NW side to allow simultaneous UL reception and DL transmission for this example. For instance, the NW has flexibility in antenna panels, modules, etc. selection to reach a threshold spatial isolation between two beams (e.g., even if pointing to the same or similar direction). Information regarding different NW beams coupling can be known to the NW based on calibration data, and this information can be used to determine pairing of UEs based on which NW beams are used in communicating with the UEs.

Figure 8:
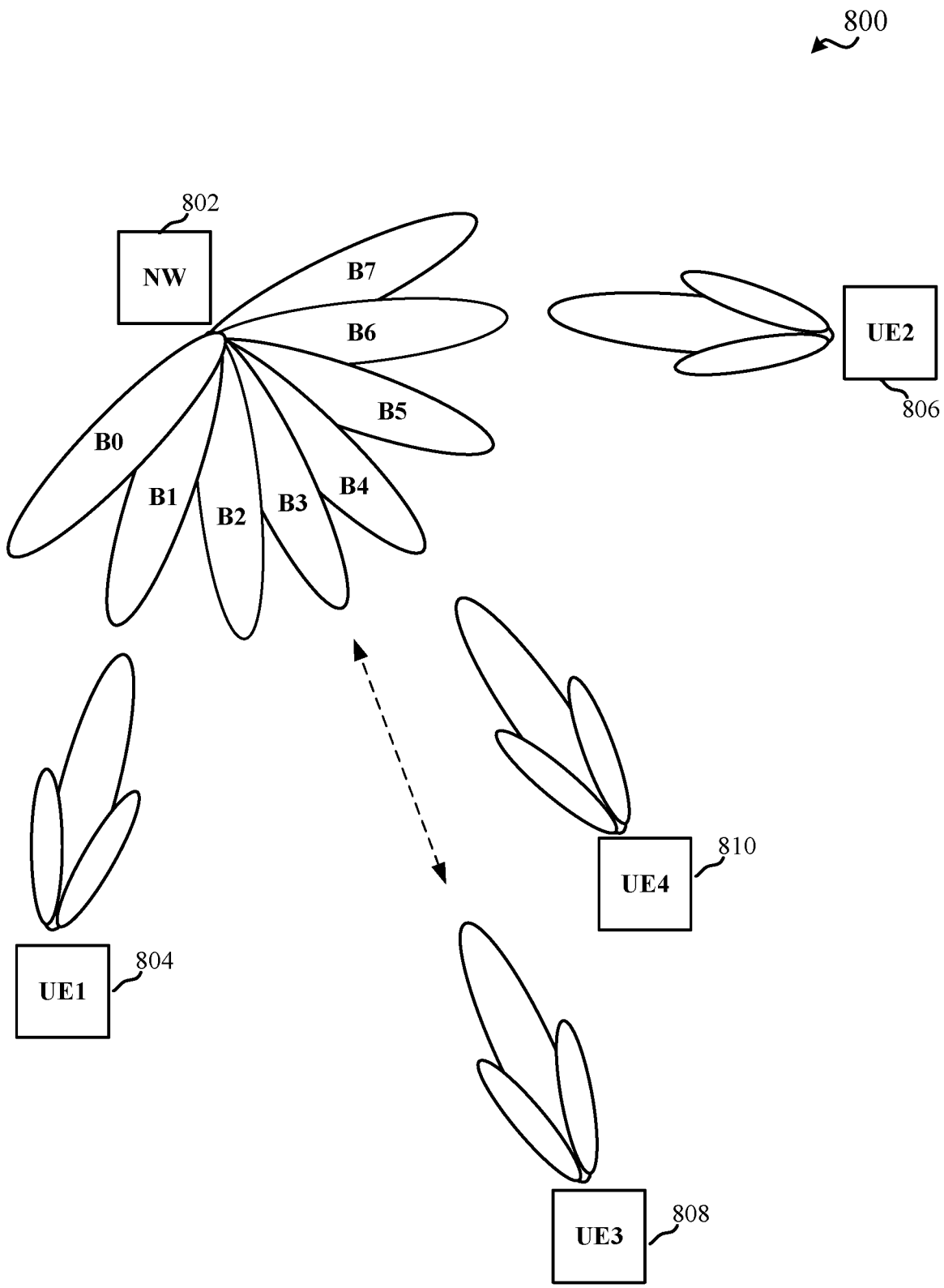
FIG. 8 illustrates an example of a system for determining pairs or groups of devices based on beams, in accordance with various aspects of the present disclosure.

FIG. 8 illustrates a system 800 including a network (NW) 802, which may include a base station 102, one or more RAN components, one or more core network components, etc., and multiple UEs, including UE1 804, UE2 806, UE3 808, and UE4 810. NW 802 can communicate with UEs using multiple beams, B0, B1, B2, B3, B4, B5, B6, B7, which can be achieved by beamforming antenna resources to achieve signal power in the associated beamforming direction. Each UE 804, 806, 808, 810 can determine a beam from the NW 802 that have desirable communication properties, and can also beamform communications to the NE 802 based on a reciprocal beam. In addition, the UEs 804, 806, 808, 810 can indicate the desired beam to NW 802 so the NW can use the beam in communicating with the UE. As depicted, for example, the beam selected by the UE can be an indicator of relative direction of location of the UE. Where beams of a pair or group of UEs are sufficiently spatially orthogonal, this may indicate a low likelihood of interference between communications of the UEs.

In FIG. 8, UE1 804 and UE2 806 can be considered fully spatially separated (e.g., configured with spatially orthogonal beams) and can be paired for concurrent UL and DL transmission over the same or at least overlapping channel (e.g., frequency resources) in the same or at least overlapping time period (same symbol, slot, subframe, etc.). For example, device grouping component 354 can determine that beams of UE1 804 and UE2 806 (e.g., beams B1 and B6) achieve a threshold spatial orthogonality. This may be based on the beam indices (e.g., a difference in beam index between the beams), known spatial information about the beams, etc.

In addition, in FIG. 8, UE3 808 and UE4 810 may be spatially close (e.g., though associated with different beams, the beams B3 and B4 may not be within a threshold spatial orthogonality to allow pairing of the UEs based on beam difference). In this example, however, UE3 808 and UE4 810 may be distant enough from one another to not significantly interfere and can be accordingly paired for concurrent UL and DL transmission and/or the beams B3 and B4 at NW 802 may be considered spatially separate enough. Accordingly, for example, device grouping component 354 can determine that the beams of UE3 808 and UE4 810 are not fully spatially orthogonal (e.g., based on the beam indices not being within a threshold difference, based on known spatial information of the beams, etc.), and may accordingly evaluate spatial separation of the UEs. For example, device grouping component 354 may determine a distance between the UEs to determine whether the UEs are spatially separated enough to concurrently receive DL communications (by one UE) and transmit UL communications (by the other UE) in overlapping time and frequency resources. In another example, device grouping component 354 may determine whether a difference in measured RSRPs of a beam intended for one UE, as measured by both UEs in the pair, achieves a threshold, and if so may determine that the UEs can be paired for concurrent communications, as described herein.

In a specific example, device grouping component 354 can schedule a P2 resource on beam B3 and schedule UE3 808 and UE4 810 for a BM report of B3 (e.g., the serving beam for UE3 808). In another example, device grouping component 354 can similarly schedule a P2 resource on beam B4 and schedule UE3 808 and UE4 810 for a BM report of B4 (e.g., the serving beam for UE4 810). In either example, device grouping component 354 can receive the BM report from UE3 808 indicating a RSRP of B3 and can receive the BM report from UE4 810 indicating the RSRP of B3 (or can receive the BM report from UE3 808 indicating a RSRP of B4 and can receive the BM report from UE4 810 indicating the RSRP of B4). Based on the difference in RSRPs for either B3 or B4, device grouping component 354 can infer whether UE3 808 and UE4 810 are spatially separated enough (e.g., at a far enough distance) from one another to be paired (e.g., where the difference in RSRP achieves a threshold) for concurrent UL and DL communications. In this or another example, device grouping component 354 can additionally or alternatively determine whether network beams corresponding to beams B3 and B4 are related to antenna resources that are spatially separated enough based on known leakage values from a NW side calibration. For example, device grouping component 354 can analyze the leakage experienced at a receiver of the NW 802 (e.g., of the base station 102) when transmitting the beams, which can be known based on calibration data as described, and if the leakage of either beam, leakage total of both beams, or another function or measure of the leakage(s) achieves a threshold, device grouping component 354 can determine that the beams are not of sufficient spatial separation. Based on this determination, device grouping component 354 can determine that UE3 408 and UE4 410 cannot be paired or can otherwise determine to evaluate the spatial separate at the UEs, as described above based on RSRP, to determine whether the UEs can be paired.

In this regard, in method 700, optionally at Block 712 for example, a beam management procedure can be performed with multiple devices, and/or determining the pairing criteria at Block 702 may be performed as part of the beam management procedure. In an aspect, scheduling component 342, e.g., in conjunction with processor(s) 312, memory 316, transceiver 302, etc., can perform the beam management procedure with the multiple devices to determine the beams used by the network to transmit communications to, and/or receive communications from, the various devices. Information regarding the selected beams may be used, as described above, in determining the pairs of devices for scheduling concurrent UL and DL communications. Moreover, in an example, the beam management procedure can be used to measure leakage experienced at the base station 102 receiver when transmitting beams, and this information may also be used, as described above, in determining whether beams have enough spatial separation to allow for scheduling UEs using the beams for concurrent UL and DL communications.

In the above-described examples, simultaneous DL and UL scheduling can be done on overlapping resources (both SF/symbols and REs) only for the paired UEs. As described, for example, device grouping component 354 can determine the paired UEs as having one or more of a minimum spatial separation between UE that is receiving DL and UE that is transmitting UL on the same resources that enables successful DL reception on receiving UE side. The same criteria can be tested on the NW side as well in an attempt to guarantee that minimum spatial separation between NW beams used to transmit DL and receive UL from the paired UEs on the same resources that enables successful UL reception on the NW side. In one example, to simplify NW scheduling procedures, scheduling component 342 can select convenient symbols/resources for UL allocations to exclude resources where any multicast signal is transmitted in DL (e.g., synchronization signal block (SSB), multicast PDCCH, multicast P2, TRS, etc.). In addition, for example, scheduling component 342 may not select symbols/resources for inband full duplex for pairs of UEs such that spatial separation criteria with a UE having Tx on the same resources is not hold for all the addressed in multicast UEs (e.g., some of the UEs may not have spatial separation with UE transmitting UL, so this UL may leak to reception of those UEs and may degrade their DL reception). In addition, to simplify NW scheduling procedures, scheduling component 342 can determine not to schedule UL on the first symbol of a subframe due to UL timing advance, as it may appear at the end of the last symbol in a previous downlink subframe (e.g., where other UEs can be scheduled with DL allocation in the previous subframe and potentially may not be orthogonal to the currently transmitting UE and not paired with it for simultaneous UL and DL transmission).

In one example, the degree of spatial separation between beams or devices can also be used to determine whether the devices can be scheduled for inband full duplex or for concurrent DL and UL communications. For example, where scheduling component 342 determines that a UE has full spatial separation (e.g., between its own Tx beam and Rx beam), scheduling component 342 may schedule the UE to use inband full duplex, as described in reference to FIGS. 4-6 above. In another example, where scheduling component 342 determines that the UE does not have full spatial separation itself but has spatial separation from another UE, device grouping component 354 can pair the UEs for concurrent UL and DL communications, as described above, which may be subject to additional considerations regarding the spatial separation of the beams of the UEs, based on known properties of respective NW beams used for the paired UEs, etc. In this example, scheduling component 342 may schedule the paired UEs for concurrent UL and DL communications (but not necessarily inband full duplex). In yet another example, device grouping component 354 can attempt to pair UEs where at least one of the UEs is determined to be on or near a cell edge (e.g., as cell-edge UEs may be more susceptible to Rx saturation due to increased Tx power, as described above, and may not be a good candidate for inband full duplex). In an example, device grouping component 354 may determine whether a UE is near a cell edge based on determining whether the uplink transmit power of the UE achieves a threshold. The examples described herein can be used to mitigate UL/DL isolation issues on the UE and NW sides (e.g., in LTE, NR, etc.). Scheduling component 342 may apply additional optimizations on top of this approach, such as RF/IF/digital cancellations of the leakage, to improve the isolation for problematic scenarios.

Figure 9:
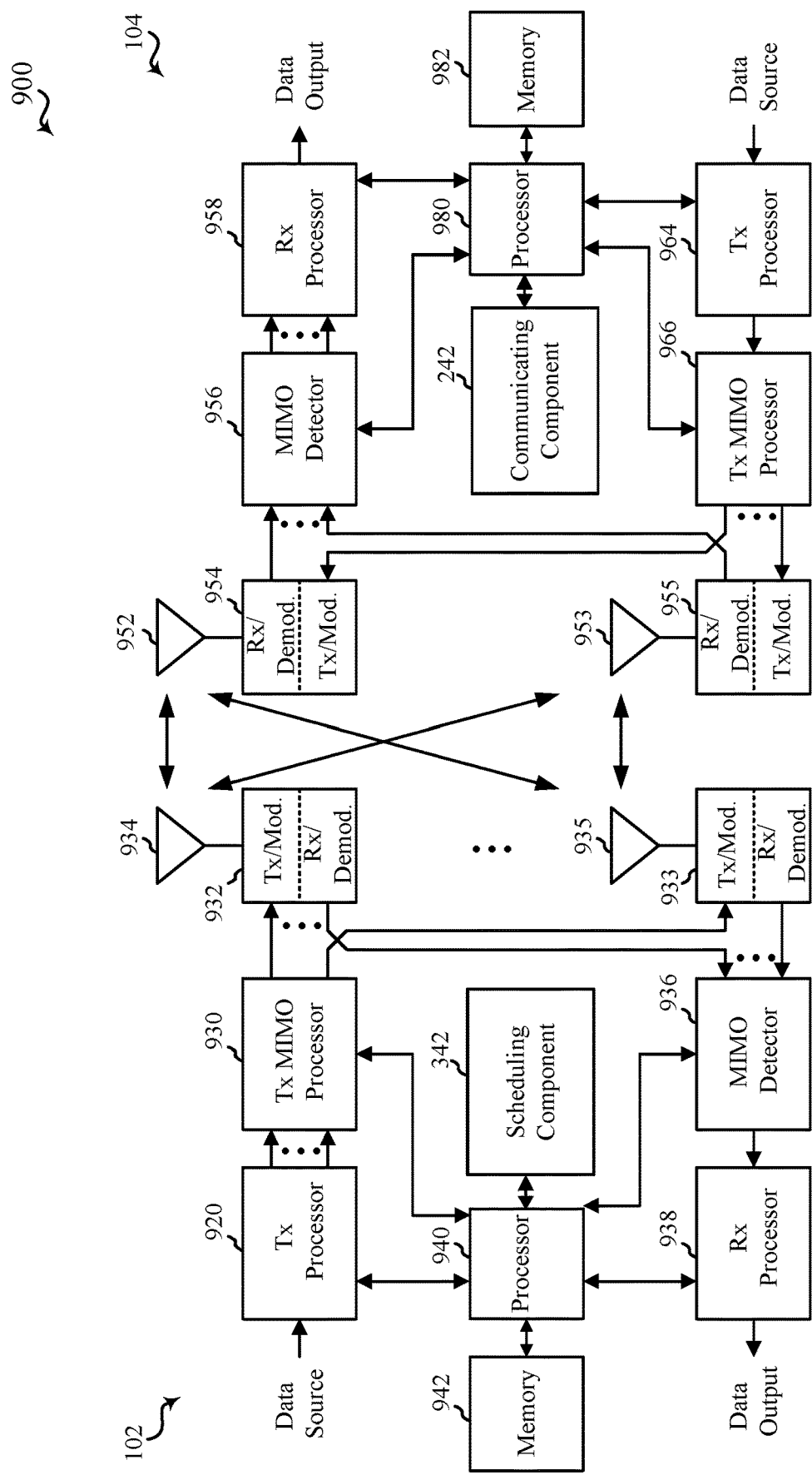
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
receiving, from a base station, a downlink resource grant of downlink resources for receiving downlink communications from the base station;
receiving, from the base station, an uplink resource grant of uplink resources for transmitting uplink communications in full inband duplex communications, wherein the uplink resources at least partially overlap the downlink resources in time and in frequency, and wherein the uplink resources correspond to a portion of punctured resource elements within the downlink resources; and
transmitting, based on the uplink resource grant, the uplink communications over the portion of punctured resource elements while receiving downlink communications in non-punctured resources corresponding to the downlink resource grant.

2. The method of example 1, wherein transmitting the uplink communications and receiving the downlink communications in full duplex mode are performed at different antenna elements or modules.

3. The method of any of examples 1 or 2, wherein transmitting the uplink communications and receiving the downlink communications are based on different UE beams formed by different antenna modules at a UE.

4. The method of claim any of examples 1 to 3, wherein the portion of punctured resource elements are consecutive in frequency and are located within the punctured resource elements, wherein the punctured resource elements include additional portions of punctured resource elements around the portion of the punctured resource elements in frequency.

5. The method of any of examples 1 to 4, further comprising reserving an extra backoff to be budgeted by one or more automatic gain control (AGC) loops of a receiver to accommodate uplink leakage during full duplex operation.

6. A method for wireless communication, comprising:
transmitting, to a device, a downlink resource grant of downlink resources for receiving downlink communications;
transmitting, to the device, an uplink resource grant of uplink resources for transmitting uplink communications, wherein the uplink resources at least partially overlap the downlink resources in time and in frequency;
determining, based at least in part on the uplink resource grant, to puncture a portion of resource elements of the downlink resources to allow for receiving uplink communications in full inband duplex communications, wherein the portion of resource elements include resource elements for the uplink transmission and additional resource elements around the resource elements for the uplink transmission, in frequency; and
transmitting, to the device, downlink communications over resource elements of the downlink resource grant that do not include the portion of resource elements determined to be punctured.

7. The method of example 6, wherein the uplink resources are consecutive in frequency and are located within the portion of resource elements that are punctured, wherein the portion of resource elements that are punctured include additional portions of resource elements around the uplink resources.

8. The method of any of examples 6 or 7, further comprising receiving, from the device the uplink communications based on a first beam, wherein transmitting the downlink communications comprises transmitting, to the device, the downlink communications based on a second beam that is generated from different antenna modules than the first beam.

9. The method of any of examples 6 to 8, further comprising determining to configure the full inband duplex communications for the device based on determining that the device is not near a cell edge, wherein transmitting the uplink resource grant of uplink resources that at least partially overlap the downlink resources is based at least in part on determining to configure the full inband duplex communications for the device.

10. A method for wireless communication, comprising:
determining, based on one or more pairing criteria, a pair of devices for enabling concurrent uplink and downlink communications over at least partially overlapping resources by the pair of devices; and
scheduling the pair of devices for concurrent uplink and downlink communications.

11. The method of example 10, wherein determining the pair of devices is based at least in part on determining that the pair of devices are associated with beams having a sufficient spatial separation.

12. The method of example 11, wherein determining that the pair of devices are associated with beams having the sufficient spatial separation comprises determining that a signal power of at least one of the beams as received at each of the pair of devices are within a threshold difference, wherein the at least one of the beams is a serving beam for at least one of the pair of devices.

13. The method of example 12, wherein determining that the signal power of the at least one of the beams are within the threshold difference comprises:
receiving, from a first device of the pair of devices, a first signal power measured of the at least one of the beams;
receiving, from the second device, a second signal power measured of the at least one of the beams; and
comparing a difference between the first signal power and the second signal power for the at least one of the beams to determine that the measured signal power is within the threshold difference.

14. The method of example 13, further comprising receiving the first signal power and the second signal power as part of a beam management procedure performed with multiple devices including the pair of devices.

15. The method of any of examples 10 to 14, wherein scheduling the pair of devices comprises scheduling the pair of devices over resources that are determined as not used for multicast signaling.

16. The method of any of examples 10 to 15, wherein scheduling the pair of devices for concurrent uplink and downlink communications comprises scheduling the uplink resources on a portion of the downlink resources the excludes a first symbol of the downlink resources in a subframe.

17. The method of any of examples 10 to 16, wherein scheduling the pair of devices for concurrent uplink and downlink communications is based on determining that at least one device of the pair of devices is near a cell edge.

18. The method of any of examples 10 to 17, further comprising scheduling another device for inband full duplex communications.

19. The method of example 18, wherein scheduling the another device for inband full duplex communications is based on determining that the another device is not near a cell edge.

20. An apparatus for wireless communication, comprising:
a memory configured to store instructions; and
one or more processors communicatively coupled with the memory, wherein the one or more processors are configured to execute the instructions to perform the operations of one or more methods in any of examples 1 to 19.

21. An apparatus for wireless communication, comprising means for performing the operations of one or more methods in any of examples 1 to 19.

22. A computer-readable medium, comprising code executable by one or more processors to perform the operations of one or more methods in any of examples 1 to 19.

What is claimed is:

1. A method for wireless communication, comprising:
receiving, from a base station, a downlink resource grant of downlink resources for receiving downlink communications from the base station;
receiving, from the base station, an uplink resource grant of uplink resources for transmitting uplink communications in full inband duplex communications, wherein the uplink resources at least partially overlap the downlink resources in time and in frequency, and wherein the uplink resources correspond to a portion of punctured resource elements within the downlink resources, wherein the portion of punctured resource elements are consecutive in frequency and are within a frequency range of punctured resource elements that include additional portions of punctured resource elements around the portion of the punctured resource elements; and
transmitting, based on the uplink resource grant, the uplink communications over the portion of punctured resource elements while receiving downlink communications in non-punctured resources corresponding to the downlink resource grant.

2. The method of claim 1, wherein transmitting the uplink communications and receiving the downlink communications in full duplex mode are performed at different antenna elements or modules.

3. The method of claim 1, wherein transmitting the uplink communications and receiving the downlink communications are based on different UE beams formed by different antenna modules at a UE.

4. The method of claim 1, further comprising reserving an extra backoff to be budgeted by one or more automatic gain control (AGC) loops of a receiver to accommodate uplink leakage during full duplex operation.

5. A method for wireless communication, comprising:
transmitting, to a device, a downlink resource grant of downlink resources for receiving downlink communications;
transmitting, to the device, an uplink resource grant of uplink resources for transmitting uplink communications, wherein the uplink resources at least partially overlap the downlink resources in time and in frequency;
determining, based at least in part on the uplink resource grant, to puncture a portion of resource elements of the downlink resources to allow for receiving uplink communications in full inband duplex communications, wherein the portion of resource elements that are punctured for uplink communications include resource elements for the uplink communications and additional resource elements around the resource elements for the uplink communications, in frequency; and transmitting, to the device, downlink communications over resource elements of the downlink resource grant that do not include the portion of resource elements determined to be punctured.

6. The method of claim 5, wherein the uplink resources are consecutive in frequency and are located within the portion of resource elements that are punctured, wherein the portion of resource elements that are punctured include additional portions of resource elements around the uplink resources.

7. The method of claim 5, further comprising receiving, from the device the uplink communications based on a first beam, wherein transmitting the downlink communications comprises transmitting, to the device, the downlink communications based on a second beam that is generated from different antenna modules than the first beam.

8. The method of claim 5, further comprising determining to configure the full inband duplex communications for the device based on determining that the device is not near a cell edge, wherein transmitting the uplink resource grant of uplink resources that at least partially overlap the downlink resources is based at least in part on determining to configure the full inband duplex communications for the device.

9. An apparatus for wireless communication, comprising:
a transceiver;
a memory configured to store instructions; and
one or more processors communicatively coupled with the memory and transceiver, wherein the one or more processors are configured to:
receive, from a base station, a downlink resource grant of downlink resources for receiving downlink communications from the base station;
receive, from the base station, an uplink resource grant of uplink resources for transmitting uplink communications in full inband duplex communications, wherein the uplink resources at least partially overlap the downlink resources in time and in frequency, and wherein the uplink resources correspond to a portion of punctured resource elements within the downlink resources, wherein the portion of punctured resource elements are consecutive in frequency and are within a frequency range of punctured resource elements that include additional portions of punctured resource elements around the portion of the punctured resource elements; and
transmit, based on the uplink resource grant, the uplink communications over the portion of punctured resource elements while receiving downlink communications in non-punctured resources corresponding to the downlink resource grant.

10. The apparatus of claim 9, wherein the one or more processors are configured to transmit the uplink communications and receive the downlink communications in full duplex mode at different antenna elements or modules.

11. The apparatus of claim 9, wherein the one or more processors are configured to transmit the uplink communications and receive the downlink communications based on different UE beams formed by different antenna modules at a UE.

12. The apparatus of claim 9, further comprising reserving an extra backoff to be budgeted by one or more automatic gain control (AGC) loops of a receiver to accommodate uplink leakage during full duplex operation.

13. A method for wireless communication, comprising:
receiving, from a first device, a first signal power measured of at least a first beam received by the first device from a base station;
receiving, from a second device, a second signal power measured of at least the first beam received by the second device from the base station, wherein the second device is configured to communicate using a second beam that is different from the first beam;
comparing a difference between the first signal power and the second signal power to determine that the measured signal power is within a threshold difference; and
scheduling, based on comparing the difference between the first signal power and the second signal power, the first device and the second device as a pair of devices for enabling concurrent uplink and downlink communications by the pair of devices over at least partially overlapping resources.

14. The method of claim 13, wherein comparing the difference between the first signal power and the second signal power indicates that the pair of devices are associated with beams having a sufficient spatial separation.

15. The method of claim 13, wherein the at least one of the beams is a serving beam for at least the first device or the second device.

16. The method of claim 13, further comprising receiving the first signal power and the second signal power as part of a beam management procedure performed with multiple devices including the pair of devices.

17. The method of claim 13, wherein scheduling the pair of devices comprises scheduling the pair of devices over resources that are determined as not used for multicast signaling.

18. The method of claim 13, wherein scheduling the pair of devices for concurrent uplink and downlink communications comprises scheduling the uplink resources on a portion of the downlink resources that excludes a first symbol of the downlink resources in a subframe.

19. The method of claim 13, wherein scheduling the pair of devices for concurrent uplink and downlink communications is based on determining that at least one device of the pair of devices is near a cell edge.

20. The method of claim 13, further comprising scheduling another device for inband full duplex communications.

21. The method of claim 20, wherein scheduling the another device for inband full duplex communications is based on determining that the another device is not near a cell edge.

* * * * *